(12) United States Patent
Rhomberg

(10) Patent No.: US 6,296,372 B1
(45) Date of Patent: Oct. 2, 2001

(54) CEILING LIGHT FITTING HAVING LIGHT SOURCE AND REFLECTOR ARRANGED ON NARROW SIDE OF PLATE-SHAPED LIGHT GUIDE

(75) Inventor: Ulrich Rhomberg, Dornbirn (AT)

(73) Assignee: Zumtobel Staff GmbH, Dornbirn (AT)

( * ) Notice: Subject to any disclaimer, the term of this patent is extended or adjusted under 35 U.S.C. 154(b) by 0 days.

(21) Appl. No.: 09/580,192

(22) Filed: May 26, 2000

Related U.S. Application Data (63) Continuation of application No. PCT/EP98/07035, filed on Nov. 4, 1998.

(30) Foreign Application Priority Data

Dec. 15, 1997 (DE) .............................. 197 55 658

(51) Int. Cl.⁷ .................................................. F21S 4/00
(52) U.S. Cl. ................... 362/225; 362/576; 362/559; 362/31; 362/217; 362/223
(58) Field of Search ................. 362/576, 559, 362/551, 225, 31, 217, 223, 224

(56) References Cited

U.S. PATENT DOCUMENTS 5,022,728   6/1991   Fandrich ........................ 385/31
5,897,201 * 4/1999   Simon ............................ 362/268

FOREIGN PATENT DOCUMENTS

| 19541971A | 5/1997 | (DE) . |
| 2161638A | 1/1986 | (GB) . |
| 2241056A | 8/1991 | (GB) . |
| WO 8902606A | 3/1989 | (WO) . |
| WO 96/21122 | 7/1996 | (WO) . |

* cited by examiner

Primary Examiner—Alan Cariaso
Assistant Examiner—Ronald E. DelGizzi
(74) Attorney, Agent, or Firm—Fitzpatrick, Cella, Harper & Scinto (57) ABSTRACT

A light fitting (1) has a light source (4) which is arranged at the narrow side (18) of a plate-like light guide (3) from which light serving for room illumination is irradiated, at least from a part region of a broad side of the light guide (3). The light fitting (1) has a light fitting carrier (2) with at least two carrier elements (16b), lying opposite one another, for holding the light guide (3). The carrier elements are arranged on carrier parts (16, 16a). Also, a reflector arrangement (5) is associated with the light source (4) which at least partially surrounds the light source (4) in a free region neighboring the light guide (3).

19 Claims, 6 Drawing Sheets

CEILING LIGHT FITTING HAVING LIGHT SOURCE AND REFLECTOR ARRANGED ON NARROW SIDE OF PLATE-SHAPED LIGHT GUIDE

CROSS REFERENCE TO RELATED APPLICATIONS

This is a Continuation of copending International Application No. PCT/EP98/07035, Filed Nov. 4, 1998; from which applicant claims priority rights provided under 35 U.S.C. Section 120.

BACKGROUND OF THE INVENTION

1. Field of the Invention

The invention relates to a light fitting, having a plate-like light guide, into which the light from a light source is irradiated, which light source is located at a narrow side of the light guide, and which light guide has on at least a part region of its one broad side a light output for the light radiating out. The light output may be formed by a light tapping layer having a microstructure.

2. Description of the Related Art

Such a light fitting is known from WO 96/21122 A1. In this publication, the light fitting is primarily described with regard to the tapping of light.

A light fitting of this kind distinguishes itself through a low structural height. Further, by means of special configurations of the layer tapping the light from the light guide there can be attained specific properties of the light, for example an non-dazzle emission of light, so that special anti-dazzle devices, such as e.g. rasters, are not needed, and which likewise contributes to reduction of the structural height. From DE 195 41 971 A1 there is known a vertically directed illuminated table, which has an edge-illuminated lighting plate which is held between two webs directed substantially perpendicularly to the two side faces of the lighting plate.

SUMMARY OF THE INVENTION

A object of the invention is to find, whilst maintaining the flat manner of construction, a simple manner of construction for a holder of the light guide and of the reflector arrangement on a light fitting carrier. This object is achieved by means of a ceiling light fitting having a horizontally directed light guide from at least a portion of a broad side of which room illumination light is irradiated. The light fitting includes a light fitting carrier which has at least two elements lying opposite one another, for holding the light guide. These elements are arranged on carrier parts and are engaged below the light guide. The light source has a reflector associated therewith and the reflector is arranged so that it at least partially surrounds the light source in a free region neighboring the light guide.

With the configuration in accordance with the invention, the light fitting carrier and the reflector arrangement form a constructional unit, in which the light guide—whilst maintaining an advantageous intake and emission of light—can be held in a simple and reliable manner. Thereby it is particularly advantageous to arrange the carrier parts, having the carrier elements for holding the light guide, at one and the same height with the light guide, whereby not only is a low construction provided, but whereby also an optimum emission of the light from the light guide and room illumination is attained.

Further, it is the object of the invention to so configure the light fitting of the kind concerned that the reflector arrangement or a reflector can be readily installed or disinstalled on the light fitting carrier, whilst maintaining a simple configuration.

In accordance with a further development of the invention, for the connection of the reflector arrangement or of the reflector with the light fitting carrier there is provided at least one plug-in connector which can be realised in a simple and compact construction and can be integrated into the light fitting construction, and furthermore allows a simple and rapid installation or dis-installation. For securing the plug-in fitting against an unintended release, there is provided a security device. Here, a securing screw may be involved, which is screwed into the wall of the plug-in recess from the outside and is positionable with the plug-in pin in the plug-in recess. The security device may also be formed by means of a clamping device, which includes a stiff fitting for the plug-in pin in the plug-in recess in the end region of its plug-in movement.

The light fittings in accordance with the invention distinguish themselves in that they fulfil the mechanical, lighting and aesthetic demands placed upon a light fitting of the kind concerned.

There are also described and claimed other features which contribute to a simple attractive construction, and make possible a hidden arrangement of associated operating means including associated electrical lines, simplify and improve the holding of the light guide, and furthermore improve the intake of the light emitted from the light source into the light guide, if applicable whilst maintaining an indirect illumination.

BRIEF DESCRIPTION OF THE DRAWINGS

Below, the invention and the further advantages which can be achieved thereby will be described in more detail with reference to preferred exemplary embodiments and simplified drawings. There are shown.

DETAILED DESCRIPTION OF THE PREFERRED EMBODIMENTS

The main parts of the light fitting, generally designated 1, are a light fitting carrier 2, a plate-like light guide 3, a light source 4, in particular a lamp, arranged at the end with regard to the light guide 3, and being in particular elongate, which is preferably formed by a fluorescent tube 4a, at least one reflector arrangement 5, which is arranged at the narrow side, at which the light source 4 is located, a first holder device 6, for holding the light fitting 1 on a carrier which is not illustrated, for example on a room ceiling, a releasable, second holder device for holding the light guide 3 on the light fitting carrier 2, a third holding device 8 for releasably holding the reflector arrangement 5 on the light fitting carrier 2, and associated operating means, not illustrated, such as electrical connection parts and for example a ballast.

The light guide 3 is formed by means of a plate having a narrow side arranged preferably at right angles to its broad side and of light permeable material such as for example of glass or plastics. The plate has, on at least one narrow side, a light inlet 9 and on at least one broad side a light outlet 11, which may extend over a part region or over the entire region of this broad side and which starts from the main emission direction for the illumination of the room. The narrow side having the light inlet 9 preferably extends straight and level. This applies also for the other sides of the plate-like light guide 3. The visible shape of the light guide 3, transverse to the broad side, is not restricted to a particular form. Preferably the light guide 3 has a quadratic, or in the case of an elongate light fitting 1, a rectangular shape.

In the region of the light inlet 9, the associated surface of the light guide is light permeable. This is also the case in the region of the light outlet 11, whereby the associated surface may here be partly light permeable, depending upon the configuration and use of the light fitting 1. With the present configuration, the surface in the region of the light outlet 11 has a light tapping microstructure, which is illustrated in a simplified manner as a light outlet layer 13. At the broad side opposite to the light outlet 11, the associated surface of the light guide 3 may be light impermeable. This may be attained by means of total reflection or for example by means of a reflection layer on this broad side. At the other narrow sides of the light guide, in dependence upon construction and desired light emergence, the associated surface may be light permeable or light impermeable, which can be attained for example likewise by means of a coating with a reflection layer.

In the present a exemplary embodiment, the light fitting 1 is a ceiling light, whereby the light guide 3 is arranged horizontally and the light outlet 11 is arranged at the lower broad side, so that the light emerges downwardly for direct illumination of the room. The light fitting in accordance with the invention is, however, suitable also for other usage arrangements, for example as a wall light fitting, whereby its position in the room is correspondingly rotated.

In particular with wide or long structural dimensions it is also possible to make up the light guide 3 of a plurality of segments. With the present exemplary embodiment there is concerned a light fitting 1 of elongate structure, whereby the light guide 3 may consist of a plurality of light guide segments 3a, here of quadratic or rectangular form, in the longitudinal direction and, in the case of appropriate width, also in the transverse direction. With the exemplary embodiment according to FIGS. 1, 2 and 6 to 10, in the longitudinal direction more than two, for example four light guide segments 3a, are arranged one after the other, and in the transverse direction two light guide segments 3a are arranged next to one another.

With regard to the longitudinally and transversely running vertical middle planes, the light fitting 1 is symmetrically formed.

The light fitting carrier 2 consists of a longitudinal stay 15 extending in the longitudinal direction and arranged centrally, which stay may be tapered at its ends and preferably is connected in one piece with respective transverse stays 16, here with their inner side. From of the free ends of the transverse stay 16 there projects in each case, at each longitudinal side, a transverse stay part 16a, back into the longitudinal direction, whereby there is provided for the endface ends of the light fitting carrier 2 in each case an E-shape. From the lower end region of the inner end of each carrier stay part 16a there projects in the longitudinal direction a thin carrier plate 16b, which engages below the associated light guide segment 3a. The inner end surface 16c of the transverse stay part 16a forms an end limit for the light guide part 3a. The spacing a between the inner end faces 16c lying opposite to one another longitudinally is so adapted to the length of the light guide segments 13a or of the light guide 13 that this fits therebetween with a slight play for movement. On the outer side of the carrier stay parts 16 there is in each case a fitting 17 for the fluorescent tubes 2a extending at a slight lateral spacing from the longitudinal narrow side 18 of the light guide 3. With regard to the associated inner end face 16c, the plug-in fitting 17 is in each case offset outwardly, so that a fluorescent tube 2a is present the length of which is greater than the longitudinal dimension L of the light guide 3, and the light emission of the fluorescent tube 2a can be irradiated into the narrow side 18 over the entire length L. For these reasons it is also advantageous to arrange the carrier elements 16b not at the narrow sides 18 of the light inlet 9, but at the other, here short narrow sides 18b of the light guide 3. Since the transverse arm parts 16b and the carrier plates 16c extend, with regard to the light guide 3, from the end side and at the outer edge of the light guide 3, the light inlet 9 is not affected by these parts.

Preferably, the longitudinal stay 15 is longer than the light guide 3, so that between its short narrow side and the transverse stay 16 a spacing b and thus a free field 19 is located. An electrical connection device with associated operating means 21, such as a for example a ballast, shown only schematically in FIG. 9, may be arranged in the longitudinal carrier 15, preferably formed as a hollow or U-shaped body, whereby the longitudinal stay 15 may be covered by means of a lid 22, at least in the region of the operating means 21, which may be attached to the webs of the longitudinal carrier 15 by means of non-illustrated attachment means, for example by means of a latching device.

The reflector arrangement 5 serves at least partially to reflect the light not directly radiated in from the light source 2, and to irradiate it into the light inlet 9. Thereby, the reflector arrangement 5 may have a reflector which surrounds the light source 2, apart from the long narrow side 18. With the present configuration, the reflector arrangement 5 has a main reflector 25, which surrounds the light source 4 on the underside and on the outside, preferably in the shape of a crescent, whereby the light source 4 is open to the upper side and the light irradiated upwardly into this region contributes indirectly to the illumination of the room. Additionally, the reflector arrangement 5 may have an auxiliary reflector 26 which is arranged above the light source 4 in the region in the vicinity of the light guide 3, and which may laterally extend for example into the middle region of the light source 4. With the present configuration, the auxiliary reflector 26 is formed by means of a strip, which is longer than the light guide 3, projects somewhat beyond both associated transverse stay parts, and is screwed to the transverse stay part 16a in this region by means of a screw 27, whereby it may inwardly end flush with the associated longitudinally directed inner side of the transverse stay part 16b.

The holder device 8 for the main reflector 25 is preferably a plug-in connection 28, with which the main reflector 25 can be connected, by means of plugging together, indirectly or directly with the light fitting carrier 2, here with the transverse stay parts 16a. With the present configuration there is provided in each end region a plug-in connection 28 having a plug-in pin 28a and a plug-in recess 28b, into which the plug-in pin 28a can be inserted and secured by means of a securing device against unintended withdrawal, e.g. in that in the end region of the insertion movement the plug-in pin 28a fits into the plug-in recess 28b with a clamping effect. The middle axes 28c of the plug-in connections 28 are directed transversely to the longitudinal direction of the main reflector 25 and preferably run horizontally, so that the main reflector 25 can be inserted, and again withdrawn, sideways into the plug-in connection 28. The plug-in recesses 28b may be formed by means of the free inner space of the preferably tube-shaped, or in cross section U-shaped and in particular upwardly open, transverse stay parts 16a, into which the plug-in pins 28a can be plugged. It is advantageous to arrange end walls 29 at the ends of the main reflector 25, which form end covers not only for the main reflector 25 but also for the associated transverse stay 16. With the present configuration, the main reflector 25 is somewhat downwardly offset with regard to the underside of the transverse stay 16. Thereby it is advantageous to adapt the end walls 29 to the cross sectional shape of the main reflector 25, whereby the shape of the end wall 29 may be formed correspondingly to the outer shape of the main reflector 25, rounded or quadrilateral (indicated by broken lines in FIGS. 6 and 10) and may, for improving the appearance of the transverse stay parts 16b, project out not only on the lower side but also on the upper side. By these means, the light fitting is given, observed from the ends, the shape of a flat body with edge bars 31, of round or quadrilateral or quadratic or rectangular cross-sectional shape, on the longitudinal sides, of the same height or thickened. Thereby it is further advantageous to arrange inwardly projecting cover wall sections 31a, in particular to mould them on as component parts, on the upper edge of the end walls in the longitudinal direction, the width of which cover wall sections may be adapted to the width of the transverse stays 16.

For the purpose of simplifying the structure and manufacture, and for reducing manufacturing costs, it is advantageous to form the end sections of the reflector 25, having the plug-in connections 28, with the end wall 29, as separate end caps 33 and provide therebetween a plug-in connection 34 with a plug-in pin 34a and a plug-in recess 34b. The middle axis of the plug-in connection 34 is directed in the longitudinal direction of the main reflector 25. This configuration makes it possible to manufacture the main reflector 25, without end caps 33, as a profile piece, e.g. as an economic extruded profile.

With the present exemplary embodiment, the main reflector 25 is formed by means of a crescent-shaped hollow profile having a concave circular arc shaped curved inner wall 25a and a circular arc convexly curved outer wall 25b, whereby a crescent-shaped hollow space 25b is provided therebetween, which at its ends forms the respective plugin recesses 34b, into which the plug-in pins 34a of corresponding crescent-shaped cross-sectional form can be inserted. For installation of the main reflector 25, the end caps 33 are first to be connected with the main reflector 25 by means of plugging together of the plug-in connections 34. Then, the end caps 33 with the main reflector 25 can be mounted on by means of plugging together into the plug-in connections 28, on the light fitting carrier 2.

Figure 1:
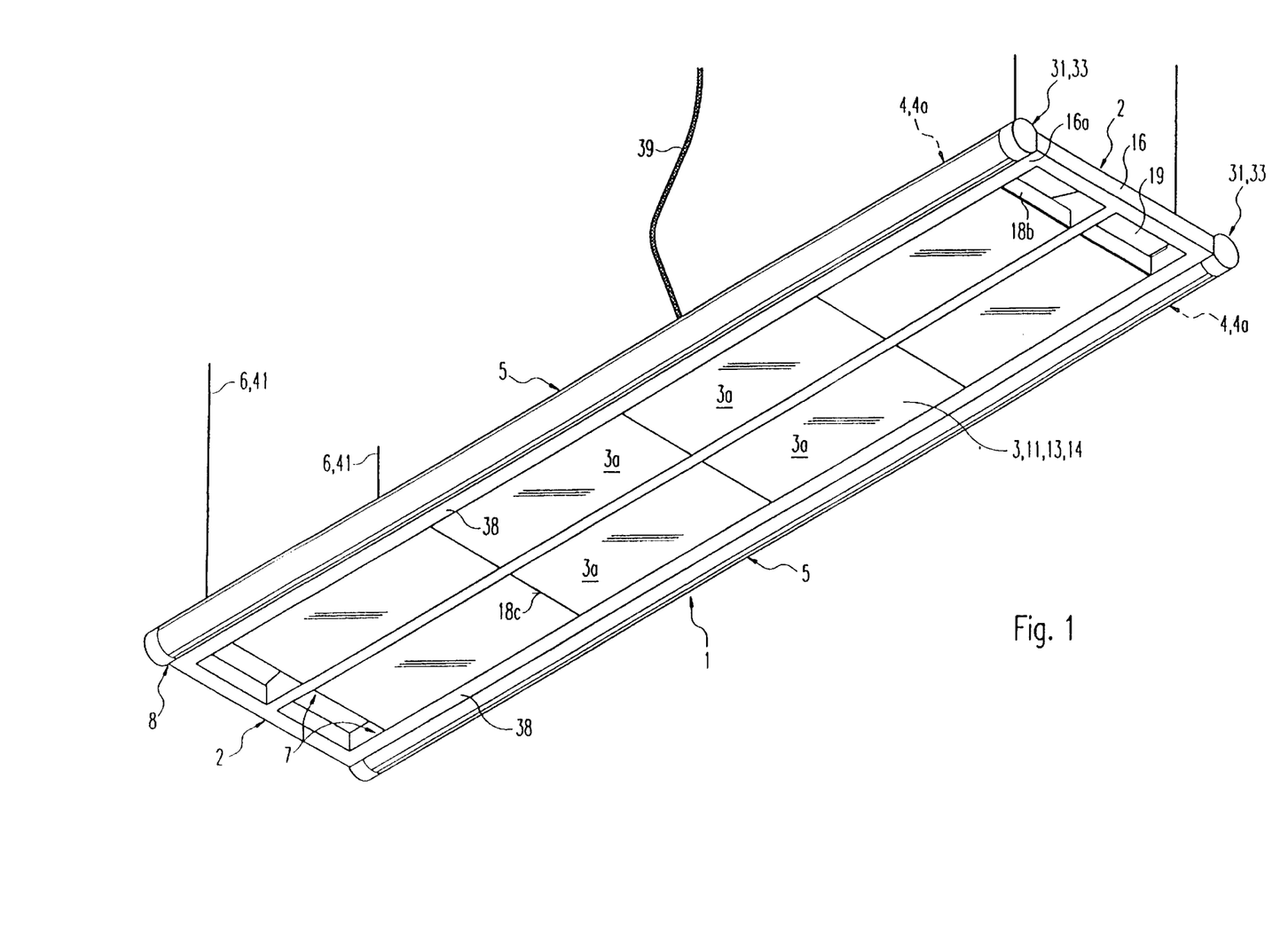
FIG. 1 a light fitting in accordance with the invention, in a perspective view from below.
Figure 2:
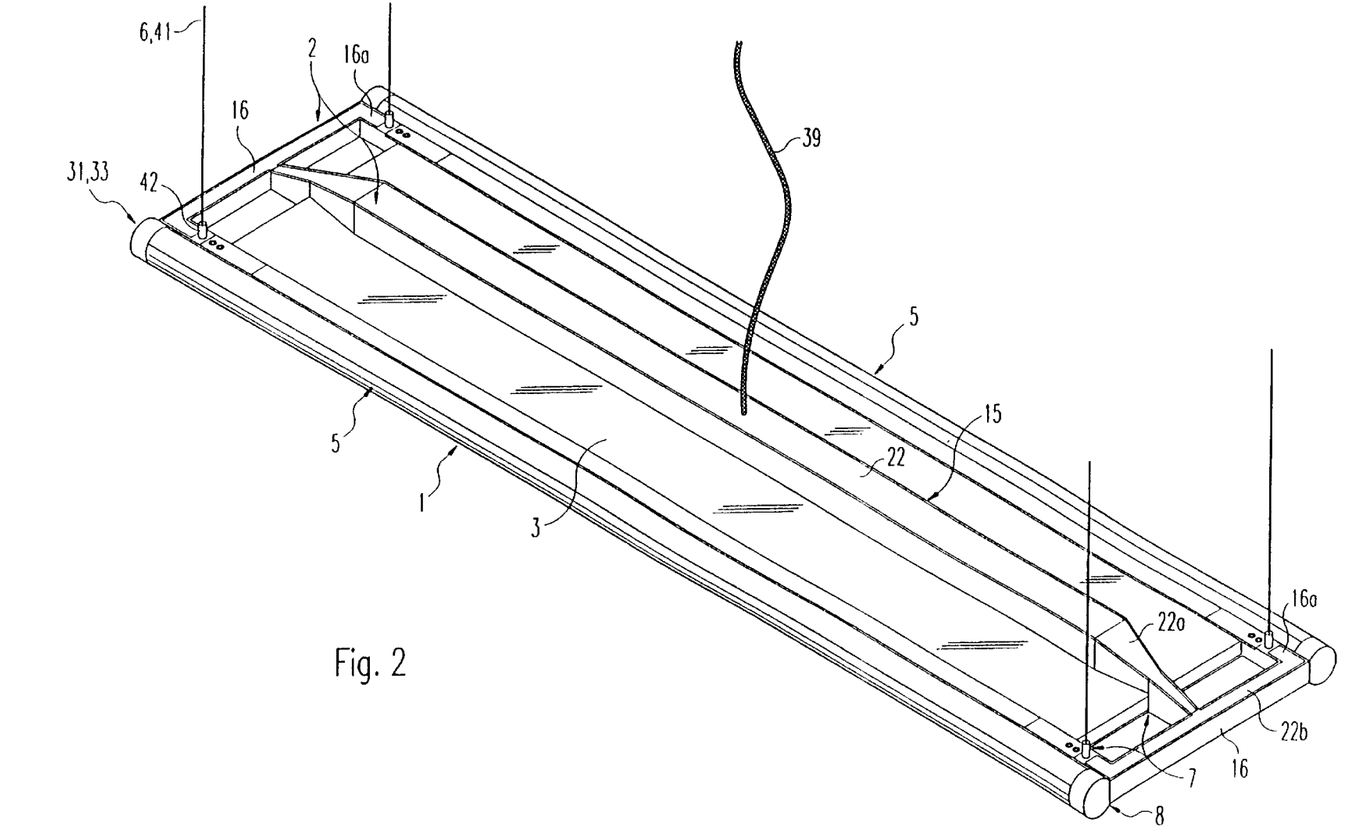
FIG. 2 the light fitting in a perspective view from above.
Figure 3:
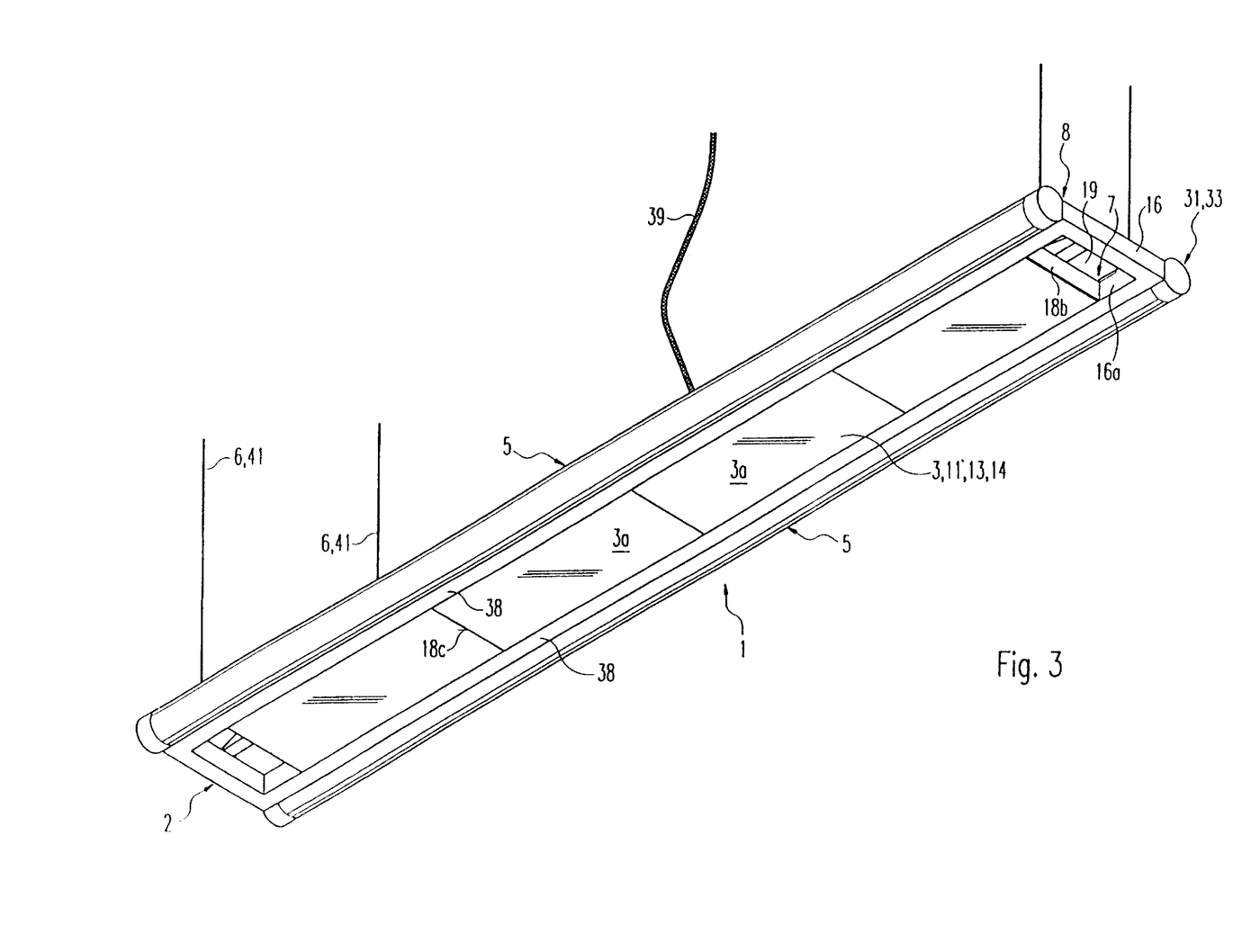
FIG. 3 a light fitting in accordance with the invention, in a modified configuration, in a perspective view from below.
Figure 4:
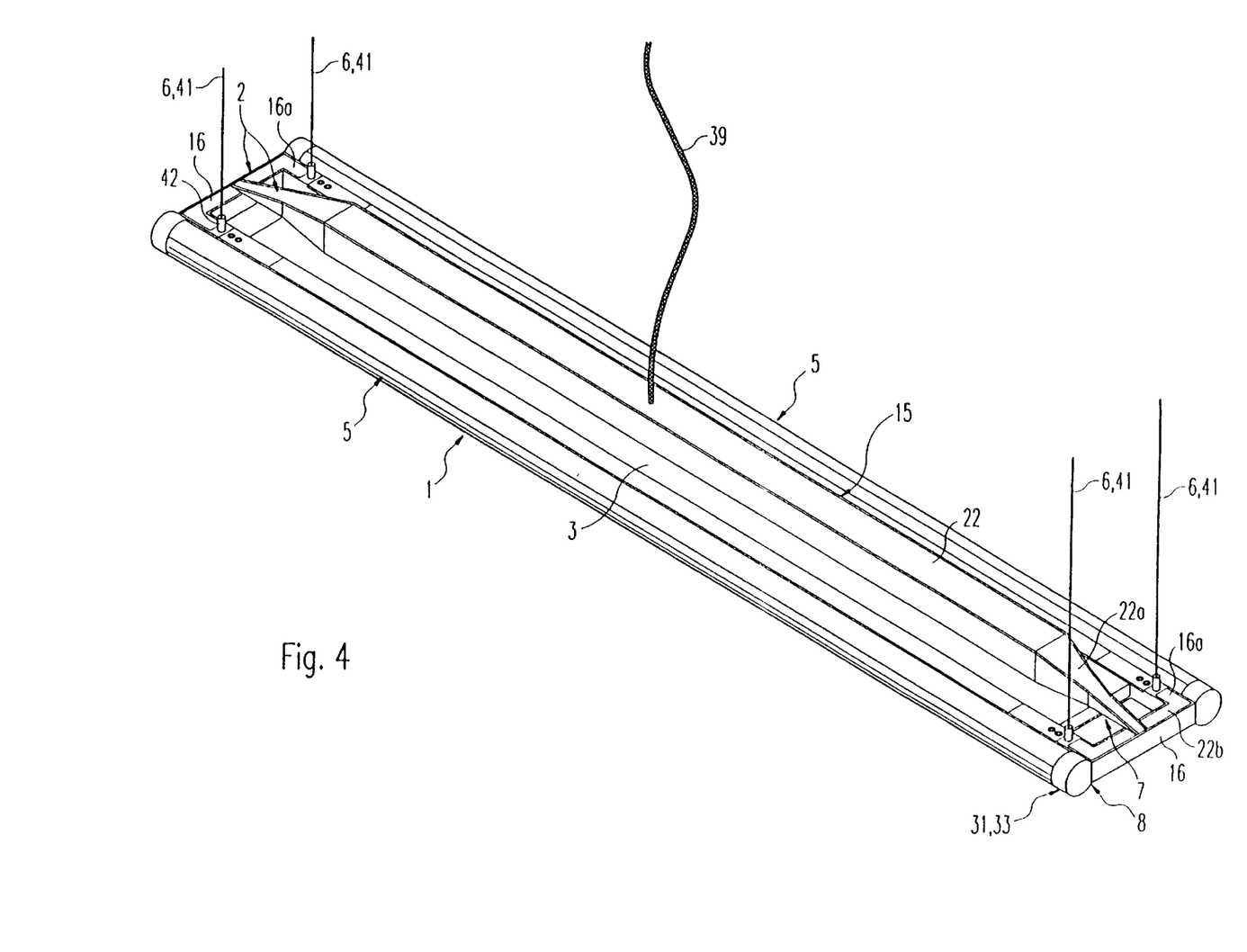
FIG. 4 the light fitting according to the FIG. 3, in a perspective view from above.
Figure 5:
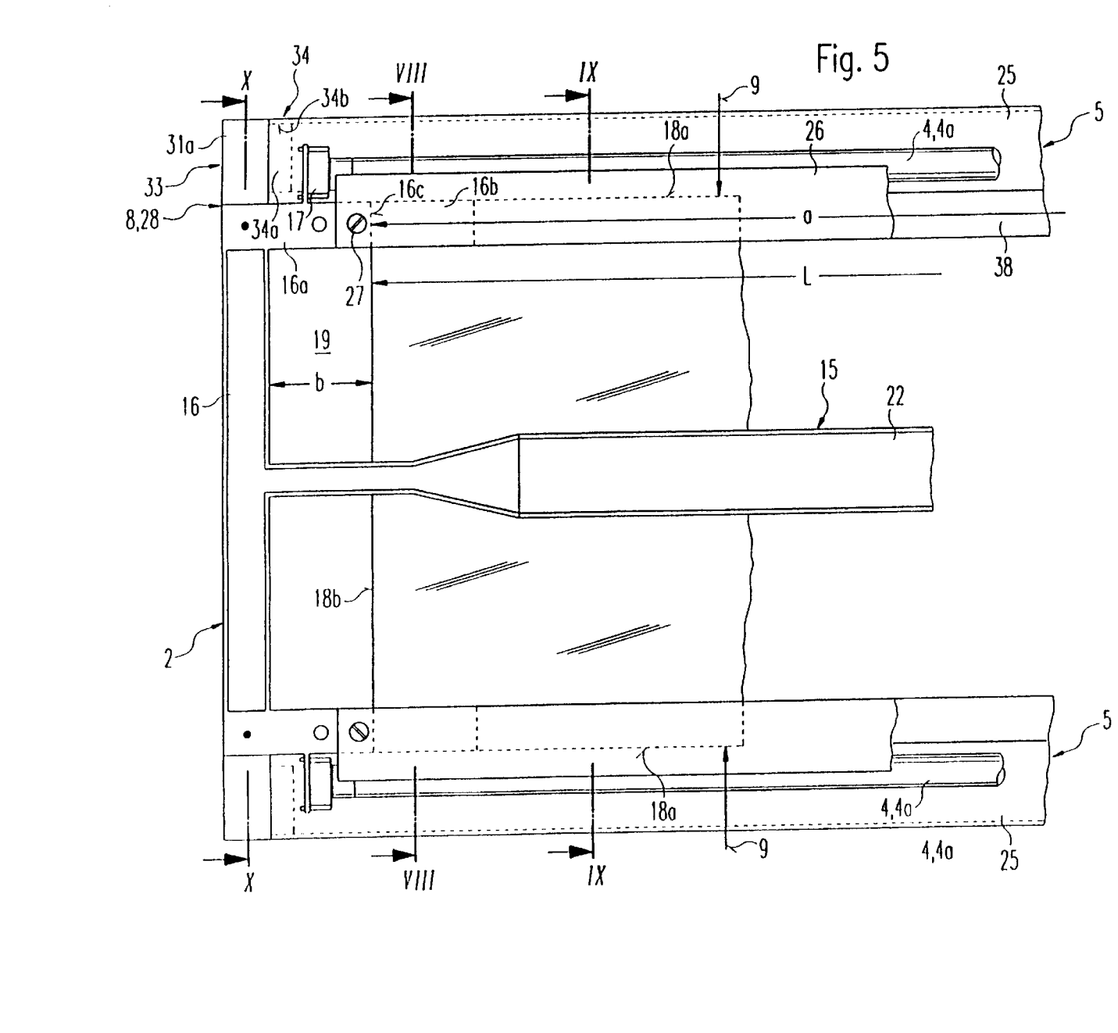
FIG. 5 an end section of the light fitting according to FIG. 1 and FIG. 2 in a view from above.
Figure 6:
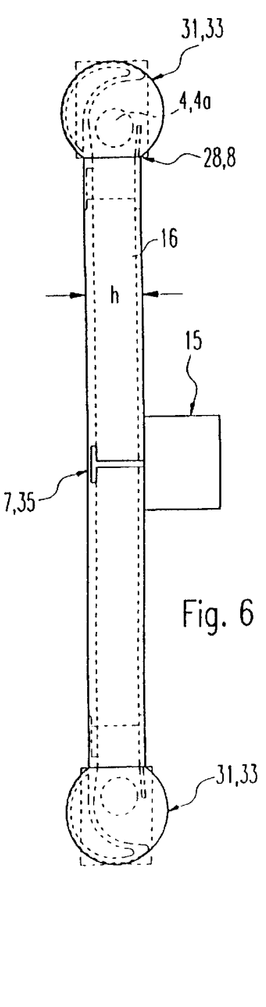
FIG. 6 the light fitting according to FIG. 1 and 2 in an end view.
Figure 7:
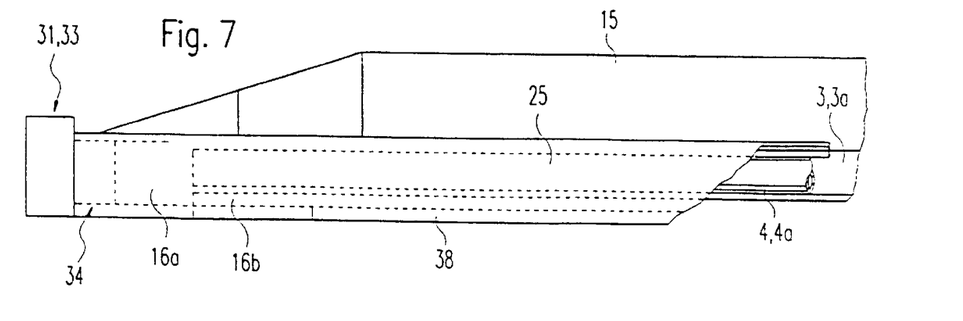
FIG. 7 the end section according to FIG. 5 in a side view.
Figure 8:
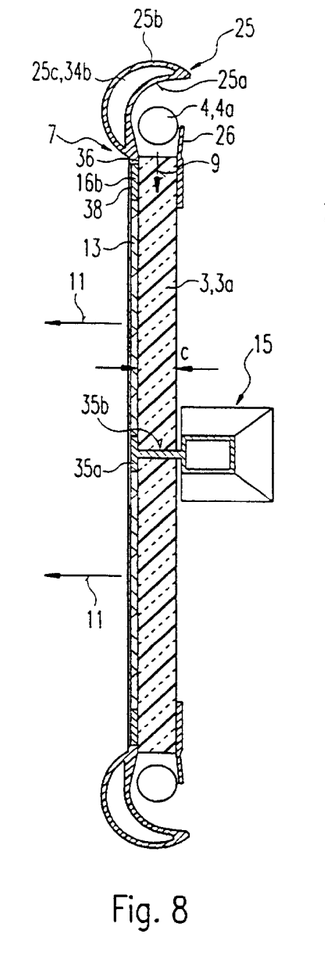
FIG. 8 the section VIII—VIII in FIG. 5.
Figure 9:
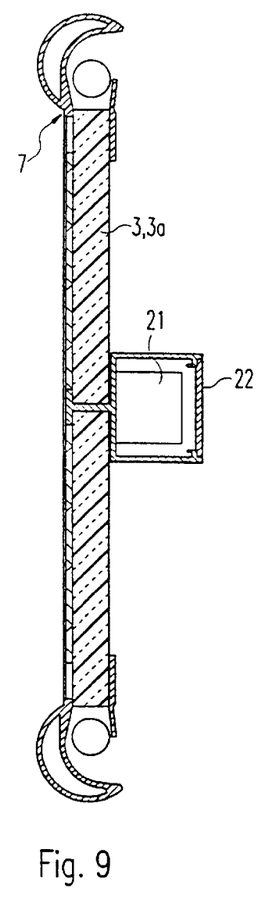
FIG. 9 the section IX—IX in FIG. 5.
Figure 10:
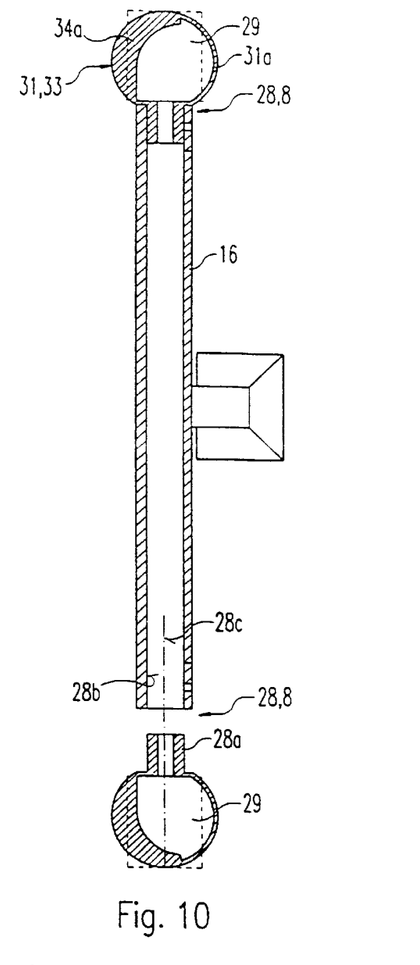
FIG. 10 the section X—X in FIG. 5.

With the exemplary embodiment in accordance with FIGS. 1 and 2 and 6 to 10, in which the light fitting 1 or the light fitting carrier 2 has a greater width than with the exemplary embodiment according to FIGS. 3 and 4, there is attached to the underside of the longitudinal stay 15 a carrier strip 35 in the cross-sectional shape of an upturned T, the vertical spacing of which from the carrier stay 15 is greater, with slight play for movement, than the thickness c of the light guide 3 or the light guide segments 3a and fits between these. Thereby, the light tapping layer 13 is arranged only between the carrier limbs 35a and the carrier plates 16b, so that the layer is located therebetween and the light guide segments 3a lay on the carrier plates 16b and carrier limbs 35a with their longitudinal edge regions formed without the light tapping layer 13, as can be understood in particular from FIGS. 8 and 9. Thereby, the light guide segments 3a may lay directly on an inner web 36 of the main reflector 25 with their outer edges, as FIGS. 8 and 9 likewise show. In that the light tapping layer 13 is located between the carrier plates 16b and the carrier limbs 35a there is provided also a form-fitting positioning of the light guide 3 or of the light guide segments 3a transversely to the longitudinal direction of the light fitting 1. This positioning device ensures a central positioning of the light guide segments 3 between the light sources 4, whereby if applicable the holder device 7 is formed in connection with the auxiliary reflector 26 forming a cover strip. As can be understood in particular from FIGS. 5, 9 and 10 the main reflector 25 has at its inner edge a tapered edge limb 38, standing up inwardly from the web 36, which engages below the carrier plates 16b arranged somewhat higher than the undersides of the transverse stay parts 16a, whereby the undersides of the transverse stay parts 16a and of the edge limb 38 lay in one plane and thus end flush with one another.

It is further advantageous to associate with the broader light fitting 1 according to FIGS. 1, 2 and 5 to 10, light sources for of greater lighting power. With the present exemplary embodiments there are provided for the narrow light fitting 1 according to FIGS. 3 and 4, fluorescent tubes 2a each of 28 W, and for the wide light fitting 1 fluorescent tubes each of 54 W.

The thickness c of the light guide 3 corresponds approximately to the diameter of the fluorescent tubes 4A and is about 25 mm. This dimension corresponds approximately also to the height h of the carrier stay 16, which is located at the same height. With the present configuration, the height h of the transverse carrier 16 consists of the height dimensions of the light guide 3, the carrier plate 16b and the edge web 38.

As can be understood in particular from FIG. 4, the transverse stay 16, in vertical cross-section U-shaped, and the longitudinal stay 15 are covered over by cover parts 22a, 22b adjoining onto the cover part 22, which may be attached in the manner already described for the cover part 22. By means of the hollow spaces of the transverse stay parts 16a and transverse stay 16 and of the longitudinal stay 15 there may also extend non-illustrated electrical lines from the operating means 21 to the fitting 17. An electrical connection cable is designated in FIGS. 1 to 4 by 39, which cable extends through a hole in the cover part 21 to the operating means 21.

The holder device 6 for holding the light fitting 1 on the non-illustrated carrier can be formed by means of four draw means 41, e.g. draw cables, which in the end regions of the light fitting carrier 2 are anchored thereto, e.g. at the transverse stay parts 16a, whereby corresponding anchoring means 42 are provided on the light fitting carrier 2, as FIG. 2 shows.

In order to avoid light losses, it is advantageous to provide the inner, longitudinally running narrow sides 45 of the light guide segments 3a or the side surfaces of the vertical web 45b of the carrier rail 35, with a reflection layer, in order to avoid loss of light. On the short narrow sides 18b, the associated surface of the light guide 3 may be light permeable, in order to attain a particular lighting effect, or it can likewise be coated with a reflection layer for the purpose of avoiding an exit of light. The narrow sides 18c of the light guide segments 3a facing one another can be correspondingly formed, which preferably bear closely on one another.

For the generation of particular lighting effects it is also advantageous to form the reflector 25 and/or 26 or partially light permeable or translucent material, in particular plastics.

The light fitting carrier 2, the main reflector 5 with the end caps 33 and the auxiliary reflector 26 are preferably pressure moulded parts or injection moulded parts of metal or plastics, in particular a light metal such as aluminum.

What is claimed is:

1. Ceiling light fitting having a light source, which is arranged at the narrow side of a plate-shaped, in substance, horizontally directed, light guide from which light serving for the room illumination is irradiated at least from a region forming a part of the broad side of the light guide, whereby the light fitting has a light fitting carrier having at least two carrier elements lying opposite one another, for holding the light guide, said carrier elements being mounted on said carrier and extending under the light guide, and a reflector which at least partially surrounds the light source in a region opposite the light guide to reflect light back from said light guide.

2. A light fitting according to claim 1 wherein, the carrier parts are located at the same height as the light guide.

3. A light fitting according to claim 1 wherein, the vertical dimension of the carrier parts approximately corresponds to or is greater than the vertical dimension of the light guide.

4. A light fitting according to claim 1 wherein, at narrow sides of said light guide, which extend transversely to a narrow side on which the light source is arranged, there are arranged two mutually oppositely lying carrier parts which extend over the entire horizontal dimension of this narrow side of the light guide or are arranged in the edge regions of the light guide.

5. A light fitting according to claim 1 wherein, the carrier elements extend on end sides of the light guide, to which end sides the end side on which the light source is located runs transversely.

6. A light fitting according to claim 4 wherein, a spacing between the carrier parts is greater than an associated dimension of the light guide, and wherein free fields are provided between the light guide and the carrier parts.

7. A light fitting according to claim 4 wherein, the reflector extends transversely to the carrier parts and connects their ends with one another.

8. A light fitting according to claim 1 wherein, there are arranged two reflector arrangements on two mutually oppositely lying sides of the light fitting.

9. A light fitting according to claim 1 wherein, two carrier parts, arranged to lie mutually opposite to each other, are connected with one another by means of a stay extending centrally over the light guide.

10. A light fitting according to claim 9 wherein, said stay and said carrier parts are hollow rails, in the hollow spaces of which the electrical operating means of the light fitting and/or electrical lines extending to the light source are arranged.

11. A light fitting according to claim 1 wherein, the light guide consists of light guide segments, which are arranged in at least one row running longitudinally and/or transversely to the light source.

12. A light fitting according to claim 11 wherein, the light fitting carrier has, between two light guide element rows, a carrier strip having the cross-sectional shape of an upturned T, whereby the mutually facing edges of neighboring light guide segments lay upon horizontal carrier limbs of the carrier strip.

13. A light fitting according to claim 1 wherein, the reflector arrangement has a first reflector which engages below and laterally behind the light source.

14. A light fitting according to claim 13 wherein, a second reflector is provided which extends outwardly over the light source, said second reflector having a horizontal dimension which is shorter than the horizontal dimension of said first reflector.

15. A light fitting according to claim 1 wherein, the reflector arrangement or the first reflector is connected with the light fitting carrier by means of a first plug-in connection having a plug-in pin and a plug-in recess receiving the pin.

16. A light fitting according to claim 15 wherein, there is provided a securing device for securing the plug-in pin in the inserted disposition.

17. A light fitting according to claim 15 wherein, a plug-in connection is arranged in each end region of the reflector arrangement or of the first reflector.

18. A light fitting according to claim 15 wherein, the middle axis of the at least one plug-in connection runs horizontally.

19. A light fitting according to claim 15 wherein, the light fitting carrier has carrier parts in the form of hollow rails, the hollow spaces of which form the plug-in recesses.

* * * * *